(12) United States Patent
Sisbot et al.

(10) Patent No.: US 9,472,023 B2
(45) Date of Patent: Oct. 18, 2016

(54) SAFETY SYSTEM FOR AUGMENTING ROADWAY OBJECTS ON A HEADS-UP DISPLAY

(71) Applicant: TOYOTA JIDOSHA KABUSHIKI KAISHA, Toyota-shi, Aichi-ken (JP)

(72) Inventors: Emrah Akin Sisbot, Mountain View, CA (US); Veera Ganesh Yalla, Sunnyvale, CA (US)

(*) Notice: Subject to any disclaimer, the term of this patent is extended or adjusted under 35 U.S.C. 154(b) by 47 days.

(21) Appl. No.: 14/507,047

(22) Filed: Oct. 6, 2014

(65) Prior Publication Data

US 2016/0098861 A1    Apr. 7, 2016

(51) Int. Cl.

| G06T 19/00 | (2011.01) |
|---|---|
| G06T 7/00 | (2006.01) |
| G06F 3/01 | (2006.01) |
| G02B 27/01 | (2006.01) |
| G06K 9/00 | (2006.01) |
| G08G 1/0962 | (2006.01) |
| G08G 1/0967 | (2006.01) |

(52) U.S. Cl.
CPC ............ *G06T 19/006* (2013.01); *G02B 27/01* (2013.01); *G06F 3/013* (2013.01); *G06K 9/00818* (2013.01); *G06K 9/00845* (2013.01); *G06T 7/004* (2013.01); *G08G 1/09623* (2013.01); *G06T 2207/30201* (2013.01); *G06T 2207/30256* (2013.01); *G06T 2207/30261* (2013.01); *G08G 1/09626* (2013.01); *G08G 1/096775* (2013.01); *G08G 1/096791* (2013.01)

(58) Field of Classification Search
CPC ..... G06F 3/013; A61B 3/113; G01C 21/365; G02B 27/01; G02B 27/017; G02B 2027/0178
See application file for complete search history.

(56) References Cited

U.S. PATENT DOCUMENTS 5,583,495 A * 12/1996 Ben Lulu ............ G01S 15/931
                                                    180/170
7,605,773 B2 * 10/2009 Janssen ................. B60K 35/00
                                                    345/156

(Continued)

FOREIGN PATENT DOCUMENTS

| DE | 102012214852 A1 | 2/2014 |
|---|---|---|
| JP | 2012121527 A | 6/2012 |
| WO | 2013128615 A1 | 9/2013 |

OTHER PUBLICATIONS

Bosch Automotive Technology, retrieved from http://www.bosch-automotivetechnology.com/en/de/driving_comfort/driving_comfort_systems_for_passenger_cars_1/driver_assistance_systems_4/driver_assistance_systems_5.html on Oct. 6, 2014, 2 pgs.

*Primary Examiner* — Gregory J Tryder
*Assistant Examiner* — Yuehan Wang
(74) *Attorney, Agent, or Firm* — Burbage Law, P.C.; Elizabeth Ruzich; Jon-Michael Burbage

(57) ABSTRACT

The disclosure includes a system and method for providing a heads-up display in a vehicle for alerting users to roadway objects. The system includes a processor and a memory storing instructions that, when executed, cause the system to: monitor, with the one or more processors, for a roadway object; detect, with the one or more processors, the roadway object; generate graphical data configured to emphasize the roadway object on a heads-up display; determine whether a user sees the roadway object; responsive to the user failing to see the roadway object, determine whether the roadway object is critical; and responsive to the roadway object being critical, enhance a graphic output on the heads-up display to get the user's attention.

22 Claims, 8 Drawing Sheets

(56) References Cited

U.S. PATENT DOCUMENTS

| | | | |
|---|---|---|---|
| 2014/0063064 A1* | 3/2014 | Seo | G08G 1/166 345/633 |
| 2014/0125812 A1* | 5/2014 | Morin | G06K 9/209 348/169 |
| 2014/0188388 A1* | 7/2014 | Malahy | G01C 21/367 701/533 |
| 2014/0218268 A1 | 8/2014 | Olesen et al. | |
| 2015/0229885 A1 | 8/2015 | Offenhaeuser | |

\* cited by examiner

SAFETY SYSTEM FOR AUGMENTING ROADWAY OBJECTS ON A HEADS-UP DISPLAY

BACKGROUND

The specification relates to providing a heads-up display in a vehicle for alerting users to roadway objects. In particular, the specification relates to determining which roadway objects the user did not see and providing a heads-up display that includes the unseen roadway objects.

Drivers often fail to notice traffic signs. This creates a safety hazard and may result in the driver getting traffic citations, or causing accidents. Existing technologies attempt to remedy the problem by displaying the traffic signs in a display, such as a liquid crystal display (LCD) on a global positioning system (GPS) device. However, in order to interpret the information on the LCD, the user has to stop focusing on the road and refocus on the LCD, which can cause an additional safety risk. In addition, the information about the traffic signs can be too limited. Other existing technologies attempt to remedy the problem by generating a heads-up display (HUD) for all roadway traffic signs. However, this can result in distracting the user with extraneous information.

SUMMARY

According to one innovative aspect of the subject matter described in this disclosure, a system for providing a heads-up display in a vehicle for alerting users to roadway objects includes a processor and a memory storing instructions that, when executed, cause the system to: monitor, with the one or more processors, for a roadway object; detect, with the one or more processors, the roadway object; generate graphical data configured to emphasize the roadway object on a heads-up display; determine whether a user sees the roadway object; responsive to the user failing to see the roadway object, determine whether the roadway object is critical; and responsive to the roadway object being critical, enhance a graphic output on the heads-up display to get the user's attention.

In general, another innovative aspect of the subject matter described in this disclosure may be embodied in methods that include: responsive to enhancing the graphic output on the heads-up display to get the user's attention, determining whether the user saw the roadway object; responsive to the user failing to see the roadway object, determining a way to enhance the graphic output on the heads-up display; receiving a first recording of the user while driving and a second recording of the road; identifying eye movement of the user in the first recording; and correlating the eye movement in the first recording to the roadway object in the second recording to determine whether the user saw the roadway object.

These and other embodiments may each optionally include one or more of the following operations and features. For instance, the features include: the graphical data on the heads-up display including representing the user's field of view in a spherical coordinate system, representing the roadway object with an angle of theta, and angle of phi, and a distance of radius; and the roadway object being a roadway traffic sign indicating a regulation applicable to driving on the roadway.

In some embodiments, the operations can include: determining whether the roadway object is critical by determining a distance between a client device and a location referenced by the roadway object and identifying the roadway object as being critical when the distance falls below a threshold; analyzing data describing roadway objects that are overlooked by drivers; determining one or more roadway objects that are overlooked by drivers; determining clusters of roadway objects overlooked by drivers; generating a map describing roadway objects overlooked by drivers; and determining a way to increase roadway safety using the map describing overlooked roadway objects. In some instances, the way to increase roadway safety using the map includes highlighting the overlooked roadway objects on the user's heads-up display. In some embodiments, determining whether the roadway object is critical is further based on an update from a social network application.

Other aspects include corresponding methods, systems, apparatus, and computer program products for these and other innovative aspects.

The disclosure is particularly advantageous in a number of respects. For example, the system can alert users to roadway objects that they failed to see, the system can emphasize roadway objects that are commonly missed by users, and the system can emphasize roadway objects that are critical. This prevents the user from potential harm, helps the user get to a destination on time, and could help with avoiding tickets.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
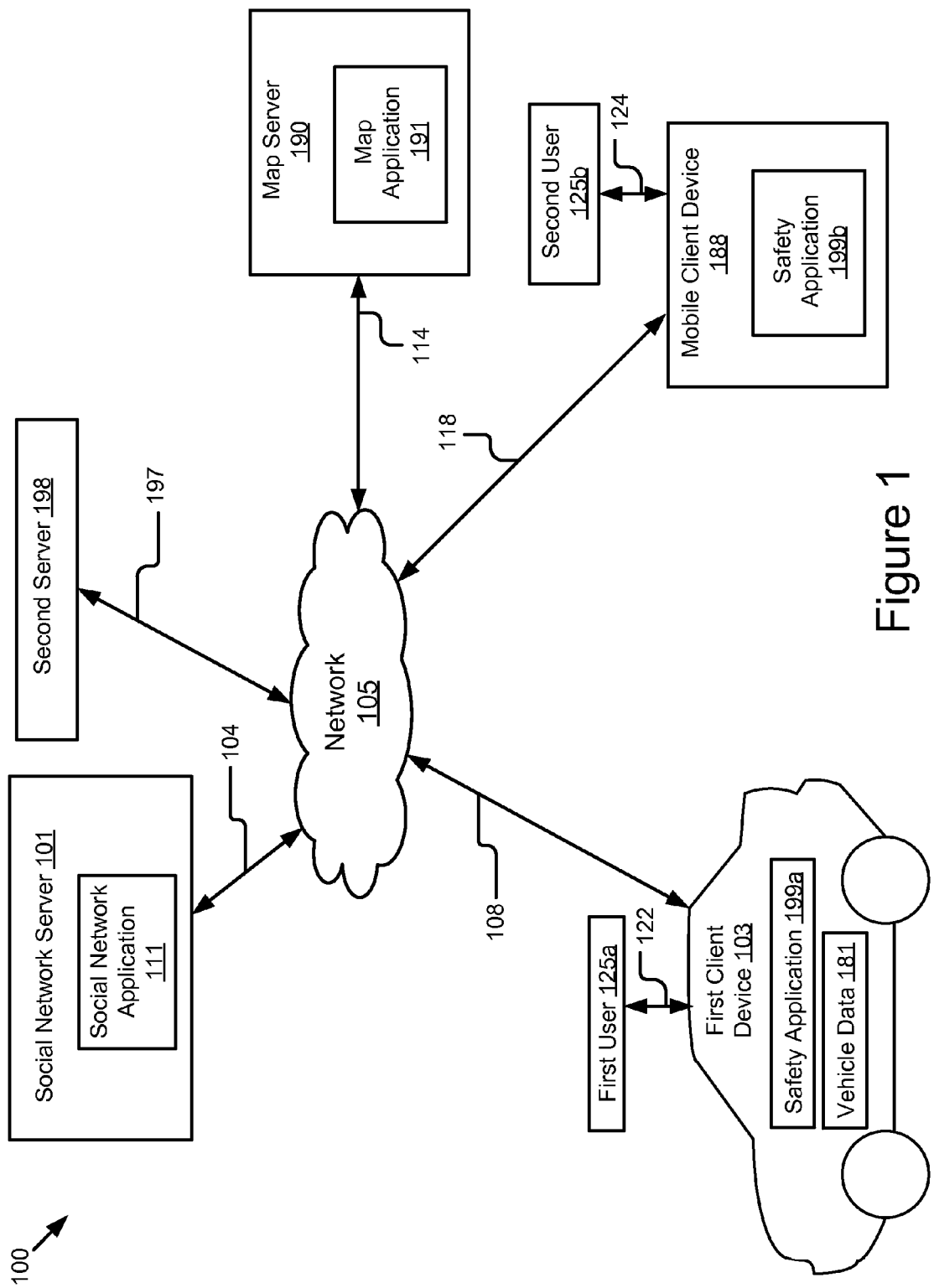
FIG. 1 is a block diagram illustrating an example system for providing a heads-up display in a vehicle for alerting users to roadway objects.

FIG. 1 illustrates a block diagram of one embodiment of a system 100 for providing a heads-up display in a vehicle for alerting users to roadway objects. The system 100 includes a first client device 103, a mobile client device 188, a social network server 101, a second server 198, and a map server 190. The first client device 103 and the mobile client device 188 can be accessed by users 125a and 125b (also referred to herein individually and collectively as user 125), via signal lines 122 and 124, respectively. In the illustrated embodiment, these entities of the system 100 may be communicatively coupled via a network 105. The system 100 may include other servers or devices not shown in FIG. 1 including, for example, a traffic server for providing traffic data, a weather server for providing weather data, a power service server for providing power usage service (e.g., billing service), and a map server for providing map data, etc.

The first client device 103 and the mobile client device 188 in FIG. 1 can be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the mobile client device 188, the social network server 101, the second server 198, and the map server 190, in practice one or more networks 105 can be connected to these entities. While FIG. 1 includes one social network server 101, one second server 198, and one map server 190, the system 100 could include one or more social network servers 101, one or more second servers 198, and one or more map servers 190.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 105 may include a GPS satellite for providing GPS navigation to the first client device 103 or the mobile client device 188. In some embodiments, the network 105 may include a GPS satellite for providing GPS navigation to the first client device 103 or the mobile client device 188. The network 105 may be a mobile data network such as 3G, 4G, LTE, Voice-over-LTE ("VoLTE"), or any other mobile data network or combination of mobile data networks.

In some embodiments, a safety application 199a can be operable on the first client device 103. The first client device 103 can be a mobile client device with a battery system. For example, the first client device 103 can be one of a vehicle (e.g., an automobile, a bus), a bionic implant, or any other mobile system including non-transitory computer electronics and a battery system. In some embodiments, the first client device 103 may include a computing device that includes a memory and a processor. In the illustrated embodiment, the first client device 103 is communicatively coupled to the network 105 via signal line 108.

In other embodiments, a safety application 199b can be operable on the mobile client device 188. The mobile client device 188 may be a portable computing device that includes a memory and a processor, for example, a laptop computer, a tablet computer, a mobile telephone, a personal digital assistant ("PDA"), a mobile e-mail device, a portable game player, a portable music player, or other portable electronic device capable of accessing the network 105.

In some embodiments, the safety application 199b may act in part as a thin-client application that may be stored on the first client device 103 and in part as components that may be stored on the mobile client device 188. In the illustrated embodiment, the mobile client device 188 is communicatively coupled to the network 105 via a signal line 118.

In some embodiments, the first client device 103 may include one or more sensors (not shown), such as a navigation sensor (e.g., a global positioning system (GPS) sensor), an infrared detector, a motion detector, a thermostat, a sound detector, and any other type of sensors. For example, the first client device 103 may include sensors for measuring one or more of a current time, a location (e.g., a latitude, longitude, and altitude of a location), an acceleration of a vehicle, a velocity of a vehicle, a fuel tank level, and a battery level of a vehicle, etc. The sensors can be used to create vehicle data 181. The vehicle data 181 can also include any information obtained during travel or received from the social network server 101, the second server 198, the map server 190, or the mobile client device 188.

In some embodiments, the first user 125a and the second user 125b can be the same user 125 interacting with both the first client device 103 and the mobile client device 188. For example, the user 125 can be a passenger or a driver sitting in the first client device 103 (e.g., a vehicle) and operating on the mobile client device 188 (e.g., a smartphone). In some other embodiments, the first user 125a and the second user 125b may be different users 125 that interact with the first client device 103 and the mobile client device 188, respectively.

The safety application 199 can be software for monitoring for roadway objects and generating graphical data configured to emphasize the roadway objects on a heads-up display associated with the first client device 103. In some embodiments, the safety application 199 can be implemented using hardware including a field-programmable gate array ("FPGA") or an application-specific integrated circuit ("ASIC"). In some other embodiments, the safety application 199 can be implemented using a combination of hardware and software. The safety application 199 may be stored in a combination of the devices and servers, or in one of the devices or servers.

The social network server 101 can be a hardware server that includes a processor, a memory, and network communication capabilities. In the illustrated embodiment, the social network server 101 is coupled to the network 105 via a signal line 104. The social network server 101 sends and receives data to and from other entities of the system 100 via the network 105. The social network server 101 includes a social network application 111. A social network can be a type of social structure where the user 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

In some embodiments, the social network application 111 generates a social network that may be used for determining traffic updates. For example, the social network application 111 could be a microblog where people post about accidents on major highways, a forum where people discuss speed traps, a social network where the user has friends that talk about congested surface roads, etc. In some embodiments, the safety application 199 receives updates from the social network application 111 and determines which roadway objects are emphasized based in part on the updates.

It is understood that the social network server 101 and the social network application 111 can be representative of one social network and that there may be multiple social networks coupled to the network 105, each having its own server, application, and social graph.

For example, a first social network may be more directed to business networking, a second may be more directed to or centered on academics, a third may be more directed to local business, a fourth may be directed to dating, and others may be of general interest or a specific focus.

The map server 190 can be a hardware server that includes a processor, a memory, and network communication capabilities. In the illustrated embodiment, the map server 190 is coupled to the network 105 via a signal line 114. The map server 190 sends and receives data to and from other entities of the system 100 via the network 105. The map server 190 includes a map application 191. The map application 191 may generate a map and directions for the user. In one embodiment, the safety application 199 receives a request for directions from the user 125 to travel from point A to point B and transmits the request to the map server 190. The map application 191 generates directions and a map and transmits the directions and map to the safety application 199 for display to the user.

In some embodiments, the system 100 includes a second sever 198 that is coupled to the network via signal line 197. The second server 198 may store additional information that is used by the safety application 199, such as infotainment, music, etc. In some embodiments, the second server 198 receives a request for data from the safety application 199 (e.g., data for streaming a movie, music, etc.), generates the data, and transmits the data to the safety application 199.

Example Map Application

Figure 2A:
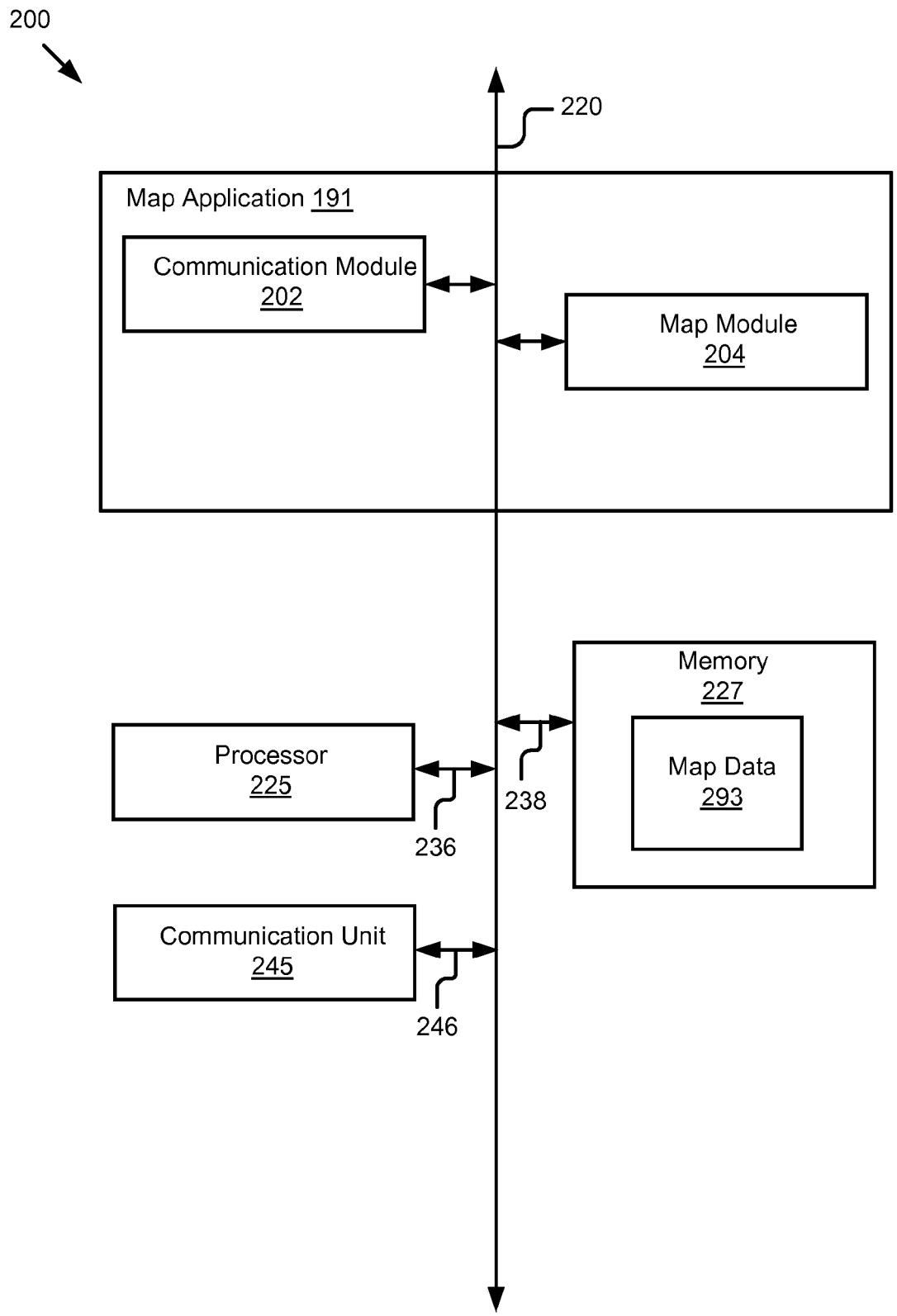
FIG. 2A is a block diagram illustrating an example map application for generating directions.

Referring now to FIG. 2A, an example of the map application 191 is shown in more detail. FIG. 2A is a block diagram of a computing device 200 that includes the map application 191, a processor 225, a memory 227, and a communication unit 245 according to some examples. The components of the computing device 200 are communicatively coupled by a bus 220. In some embodiments, the computing device 200 can be one of the map server 190, the first client device 103, or the mobile client device 188.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 238. The instructions or data may include code for performing the techniques described herein. The memory 227 may be a dynamic random access memory (DRAM) device, a static random access memory (SRAM) device, flash memory, or some other memory device.

In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores map data 293. The map data 293 can be data describing particular locations. For example, the map data 293 may include a road map for an area, satellite views of an area, street views of an area, etc. The map data 293 may be limited to a particular geographic location (United States, Colorado San Jose) or include the world. In some embodiments, the map data 293 includes directions for getting from point A to point B.

The communication unit 245 transmits and receives data to and from at least one of the first client device 103 and the mobile client device 188, depending upon where the safety application 199 is stored. The communication unit 245 is coupled to the bus 220 via a signal line 246. In some embodiments, the communication unit 245 includes a port for direct physical connection to the network 105 or to another communication channel. For example, the communication unit 245 includes a USB, SD, CAT-5, or similar port for wired communication with the first client device 103. In some embodiments, the communication unit 245 includes a wireless transceiver for exchanging data with the first client device 103 or other communication channels using one or more wireless communication methods, including IEEE 802.11, IEEE 802.16, BLUETOOTH®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The map application 191 comprises a communication module 202 and a map module 204. The communication module 202 can be software including routines for handling communications between the map application 191 and other components of the computing device 200. In some embodiments, the communication module 202 can be a set of instructions executable by the processor 225 to provide the functionality described below for handling communications between the map application 191 and other components of the computing device 200. In some embodiments, the communication module 202 can be stored in the memory 227 of the first client device 103 and can be accessible and executable by the processor 225.

The communication module 202 receives data and transfers the data to the map module 204. For example, the user 125 of the safety application 199 may request a map of the user's 125 location. The communication unit 245 receives the request and transfers the request to the communication module 202, which transmits the request to the map module 204. Once the map module 204 generates the map, the map module 204 transmits the map to the communication module 202, which transmits the map to the communication unit 245 to transmit the map over the network 105 to the safety application 199.

The communication module 202 can communicate with the first client device 103 or the mobile client device 188. In the example above, if the request from the safety application 199 did not include the user's location, the communication module 202 could request location data from the safety application 199.

The map module 204 includes code and routines for generating a map on the computing device 200. For example, the map application 191 receives a request for directions from the safety application 199 (via the communication module 202). The map application 191 determines the start and end for the directions, retrieves the map data 293 from the memory 227, and generates directions based on the map data 293.

Example Safety Application

Figure 2B:
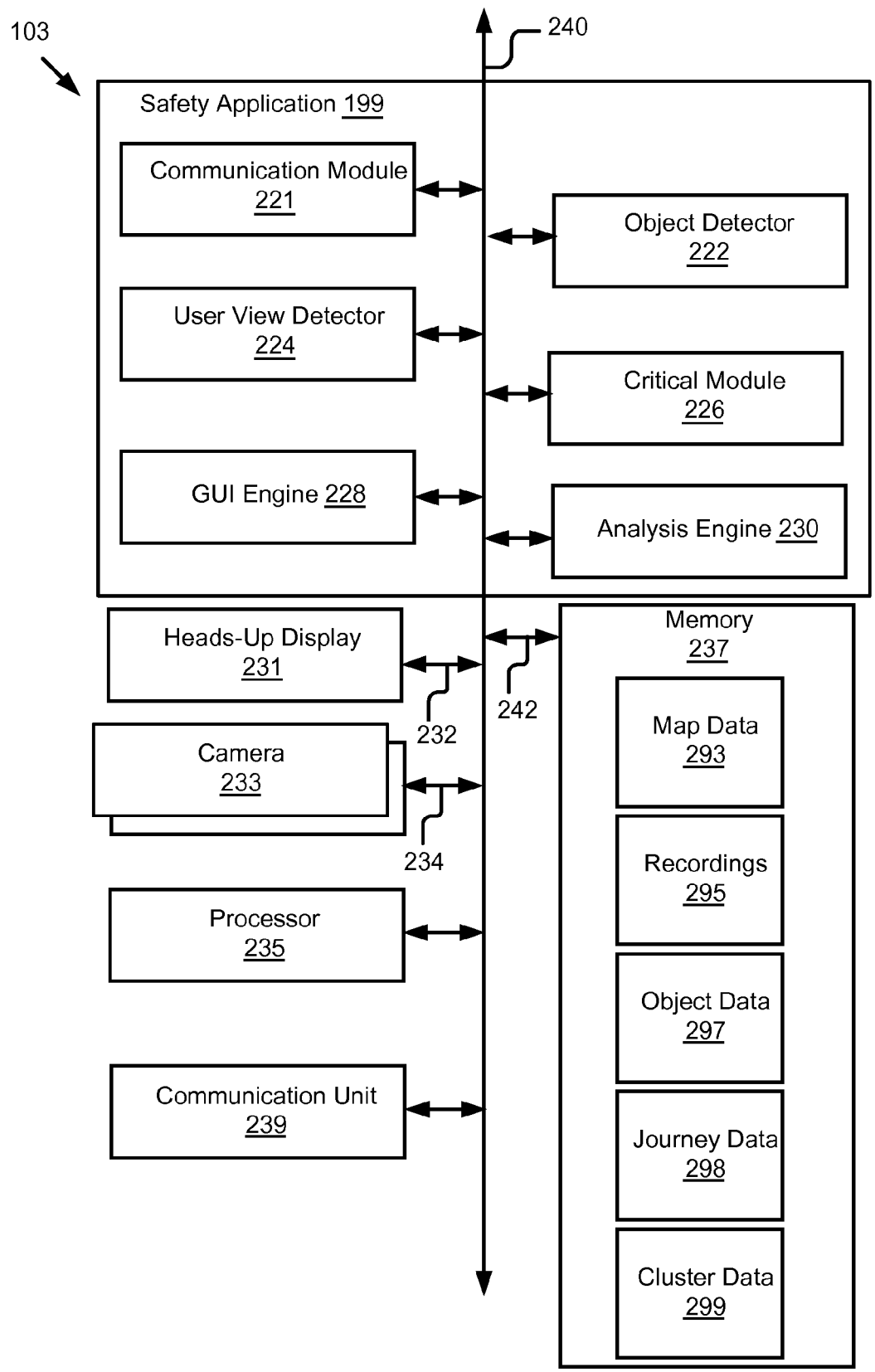
FIG. 2B is a block diagram illustrating an example safety application for generating the heads-up display.

Referring now to FIG. 2B, an example of the safety application 199 is shown in more detail. FIG. 2B is a block diagram of the first client device 103 that includes the safety application, a heads-up display 231, a camera 233, a processor 235, a memory 237, and a communication unit 239. The components of the first client device 103 are communicatively coupled by a bus 240. Although FIG. 2B illustrates the safety application 199 being stored on the first client device 103, persons of ordinary skill in the art will recognize that the safety application 199 can be stored on the mobile client device 188 where certain hardware would not be applicable. For example, the mobile client device 188 would not include the heads-up display 231 or the camera 233. In other embodiments, the safety application 199 can be stored in part on the first client device 103 and in part on the mobile client device 188. For example, the safety application 199 on the mobile client device 188 could receive user input, but the processing of the user input could be performed by the safety application 199 on the first client device 103.

The heads-up display 231 includes hardware for displaying graphical data in front of a user such that they do not need to look away from the road to view the graphical data. For example, the heads-up display 231 may include a physical screen or it may project the graphical data onto a transparent film that is part of the windshield of the first client device 103 or part of a reflector lens. In some embodiments, the heads-up display 231 is included as part of the first client device 103 during the manufacturing process or is later installed. In other embodiments, the heads-up display 231 is a removable device. In some embodiments, the graphical data adjusts a level of brightness to account for environmental conditions, such as night, day, cloudy, brightness, etc. The heads-up display is coupled to the bus 240 via signal line 232.

The heads-up display 231 receives graphical data for display from the safety application 199. For example, the heads-up display 231 receives graphical data for emphasizing a roadway object, such as a speed limit sign or a hitchhiker The roadway object also includes roadway traffic signs of regulations applicable to driving on the roadway. The camera 233 is coupled to the bus via signal line 240.

The cameras 233 include at least one interior camera 233 for recording the user and at least one external camera 233 for recording the road. The interior camera 233 records the user's face and, in particular, the user's eyes. The recording includes a timestamp for synching with the recording from the exterior camera 233. The interior camera 233 transmits the recording to the safety application 199. In some embodiments where multiple interior cameras 233 are used, the interior cameras 233 may be positioned to capture different angles of the user's face. In some embodiments, an additional interior camera 233 is used to record the road from the user's perspective. For example, the interior camera 233 could be located above the user's head and faces the road.

The exterior camera 233 is positioned in the front part of the car and records roadway objects. For example, the exterior camera 233 is positioned to record everything that the user can see. The recording also includes a timestamp for synching with the recording from the interior camera 233. The exterior camera 233 transmits the recording to the safety application 199. In some embodiments where multiple exterior cameras 233 are used, the exterior cameras 233 may be positioned to maximize the views of the road. For example, the exterior cameras could be positioned on each side of the grill.

The processor 235 and the communication unit 239 are similar to the processor 225 and the communication unit 245 that are discussed with reference to FIG. 2A and will not be discussed again.

The memory 237 stores instructions or data that may be executed by the processor 235. The memory 237 is coupled to the bus 240 for communication with the other components via a signal line 338. The instructions or data may include code for performing the techniques described herein. The memory 237 may be a dynamic random access memory (DRAM) device, a static random access memory (SRAM) device, flash memory, or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory is coupled to the bus 240 via signal line 242.

As illustrated in FIG. 2B, the memory 237 may store any of the map data 293, recordings 295, object data 297, journey data 298, and cluster data 299. In some embodiments, the previous information is classified as the vehicle data 181 associated with the first client device 103 as illustrated in FIG. 1. In some embodiments, the map data 293 includes any of the map data 293 received from the map application 191. In other embodiments, the map data 293 includes a most recent map from the map application 191.

The recordings 295 are received from the cameras 233. For example, the recordings 295 include videos from the internal cameras 233 and videos from the external cameras. The object data 297 includes information about roadway objects. For example, the object data 297 could include roadway objects that are identified by an object detector 222 in the recordings 295 from the external cameras 233, enhanced graphical images of the roadway objects, etc.

The journey data 298 includes information about the user's journey, such as start points, destinations, durations, routes associated with historical journeys, etc. For example, the journey data 298 could include a log of all locations visited by the first client device 103, all locations visited by the user 125 (e.g., locations associated with both the first client device 103 and the mobile client device 188), locations requested by the user 125, etc. The cluster data 299 includes information about user 125 reactions to roadway objects. For example, the cluster data 299 includes statistics about how often users miss a certain roadway object at a specific location.

In some embodiments, the safety application 199 includes a communication module 221, the object detector 222, a user view detector 224, a critical module 226, a graphical user interface (GUI) engine 228, and an analysis engine 230.

The communication module 221 can be software including routines for handling communications between the safety application 199 and other components of the first client device 103. In some embodiments, the communication module 221 can be a set of instructions executable by the processor 235 to provide the functionality described below for handling communications between the safety application 199 and other components of the first client device 103. In some embodiments, the communication module 221 can be stored in the memory 237 of the first client device 103 and can be accessible and executable by the processor 235.

The communication module 221 sends and receives data, via the communication unit 239, to and from one or more of the first client device 103, the mobile client device 188, the map server 190, the social network server 101, and the second server 198 depending upon where the safety application 199 is stored. For example, the communication module 221 receives, via the communication unit 239, an update from the social network server 101 about a recent traffic accident and sends the update to the GUI engine 228 for incorporation into the heads-up display 231. In another example, the communication module 221 receives graphical data for providing a user interface to a user from the GUI engine 228 and sends the graphical data to the heads-up display 231, causing the heads-up display 231 to present the user interface to the user.

In some embodiments, the communication module 221 receives data from components of the safety application 199 and stores the data in the memory 237. For example, the communication module 221 receives the object data 297 determined by the object detector 222 and stores the data in the memory 237.

In some embodiments, the communication module 221 may handle communications between components of the safety application 199. For example, the communication module 221 receives data describing objects from the object detector 222 and transmits the data to the analysis engine 230.

The object detector 222 can be software including routines for identifying roadway objects. In some embodiments, the object detector 222 can be a set of instructions executable by the processor 235 to provide the functionality described below for identifying roadway objects. In some embodiments, the object detector 222 can be stored in the memory 237 of the first client device 103 and can be accessible and executable by the processor 235.

In some embodiments, the object detector 222 receives the recordings 295 of the road from the camera 233 or retrieves the recordings 295 from the memory 237 and identifies roadway objects in the recordings 295 that are stored as the object data 297 in the memory 237. For example, the object detector 222 could have templates of the dimensions of objects that are likely to be encountered on the road such as an octagonal shape representing a stop sign, a square representing a speed limit sign, etc. The templates can be supplemented by color and location information as well. For example, where octagonal shapes can be used for roadway objects, the object detector 222 can further confirm that the octagonal shape is a stop sign because the sign is red. In another example, where a square object could indicate miles per hour or distances of the next exits on a highway, the object detector 222 can determine that the roadway object is a speed limit sign if the roadway object is on the side of the road or a mileage indicator if the sign is located on an overpass.

In some embodiments, the object detector 222 performs optical character recognition (OCR) on the roadway objects to identify text on the signs. For example, the object detector 222 further confirms that the octagonal shape is a stop sign by performing OCR to determine that the text is "STOP."

The object detector 222 may compare the text to a dictionary of common roadway object text to help confirm the OCR result. In another example, the object detector 222 performs OCR to generate metadata to help the user. For example, the object detector 222 performs OCR on the mileage indicator to identify the distance between the first client device 103 and the next exit. The critical module 226 can use the information to determine whether the roadway object is critical because if the next exit is only 0.25 miles away, the user needs to take the exit, and the user is in the left lane, the roadway object should be enhanced on the heads-up display. In some embodiments, the object detector 222 instructs the GUI engine 228 to generate graphical data configured to emphasize all roadway objects on the heads-up display.

The user view detector 224 can be software including routines for determining whether a user saw a roadway object. In some embodiments, the user view detector 224 can be a set of instructions executable by the processor 235 to provide the functionality described below for determining whether a user saw a roadway object. In some embodiments, the user view detector 224 can be stored in the memory 237 of the first client device 103 and can be accessible and executable by the processor 235.

The user view detector 224 receives the recording 295 of the user while driving from the camera 233 or retrieves the recording 295 from the memory 237. The user receives the object data 297 from the object detector 222 or retrieves the object data 297 from the memory 237. The user view detector 224 determines whether the user viewed the roadway object by determining whether the user was looking in the direction of the roadway object. For example, the user view detector 224 identifies the location of the user's eyes in a frame to determine where the user is looking at the road. The user view detector 224 then compares the user's view to the location of roadway objects from a frame of the recording 295 from the external camera 233 at the same timestamp.

The user view detector 224 can supplement the determination of the direction that the user is looking in with additional data. For example, the user view detector 224 applies a threshold time for how long the user looks in a particular direction (e.g., one second, five seconds, etc.) before the user view detector 224 determines that the user viewed the object. In another example, the user view detector 224 confirms that the user viewed an object when the user's pupils dilated, which is an indication of interest. In another embodiment, the user view detector 224 uses additional user actions. For example, if the roadway object is a police car and the user slows down after looking in the direction of the police car, the user view detector 224 determines that the user viewed the roadway object. In some embodiments, the user view detector 224 instructs the GUI engine 228 to deemphasize or remove the graphic output once the user view detector 224 determines that the user viewed the roadway object.

In some embodiments, the user view detector 224 uses training to determine a baseline of user responses for determining whether the user saw the roadway object. The training can be for users in general or the first user 125a of the first client device 103 in particular. The training can include users driving in the first client device 103 while the external camera 233 and the internal camera 233 make the recordings 295. The user view detector 224 determines whether the user viewed roadway objects. After the user view detector 224 makes the determination (or at the end of the exercise) the user is asked to confirm whether the user saw objects that the user view detector 224 determined the user saw. If the user view detector 224 has a high falsepositive rate (i.e., the user did not see what the user view detector 224 determined that the user saw), the user view detector 224 alters the settings. For example, where the threshold time for looking at an object is two seconds, the user view detector 224 advances the threshold time to three seconds.

The critical module 226 can be software including routines for determining whether a roadway object is critical. In some embodiments, the critical module 226 can be a set of instructions executable by the processor 235 to provide the functionality described below for determining whether the roadway object is critical. In some embodiments, the critical module 226 can be stored in the memory 237 of the first client device 103 and can be accessible and executable by the processor 235.

In some embodiments, the critical module 226 receives a notification from the user view detector 224 that after the roadway object was emphasized, the user still failed to see the roadway object. In response, the critical module 226 determines whether the roadway object is critical before instructing the GUI engine 228 to additionally enhance the graphic output. In some embodiments, the object data 297 could include an indication for each roadway object about whether it is critical or not. For example, all indications of a traffic accident and speed limit are marked as being critical.

In some embodiments, the determination of whether a roadway object is critical is based on the user's personal preference. For example, the GUI engine 228 can generate a user interface where a user specifies preferences including marking certain types of roadway objects as critical. In another example, the critical module 226 determines whether the roadway object is critical based on historical user behavior. For example, where the user has a 70% failure rate to see a certain type of roadway object, the critical module 226 can mark the type of roadway object as critical. In some embodiments, the critical module 226 uses additional information related to the user, such as the user's driving history and list of citations. For example, when a user has more than a threshold number of speeding violations (e.g., three speeding tickets), the critical module 226 designates speed limit signs as critical. In another example, when a user has a threshold number of parking tickets, the critical module 226 determines that parking signs are critical. In some embodiments, the critical module 226 could supplement the determination of criticality based on information including updates from other users associated with a first user on the social network application 111. For example, if the first user's friend sends a post about a speed trap that is near the first user, the critical module 226 determines that the speed trap is critical.

In some embodiments, the critical module 226 designates a roadway object as critical based on a changing circumstance. For example, a roadway traffic sign informing the user of an exit may not be critical until the user is less than one mile away from the exit. Once the distance between the first client device 103 and the location referenced by the roadway traffic object falls below a threshold distance, the critical module 226 determines that the roadway object is critical and instructs the GUI engine 228 to enhance the graphic output.

In some embodiments, the critical module 226 determines whether roadway objects are critical based on a ranking of how critical types of roadway objects are. For example, the critical module 226 can designate parking signs as less critical than mileage signs, which are less critical than speed limit signs, which are less critical than accident notifications, which are equal to speed trap notifications. In some embodiments, the GUI engine 228 generates a user interface where the user can override any determination of which roadway objects are critical.

The graphical user interface (GUI) engine 228 can be software including routines for generating graphical data for providing user interfaces. In some embodiments, the GUI engine 228 can be a set of instructions executable by the processor 235 to provide the functionality described below for generating graphical data for providing user interfaces. In some embodiments, the GUI engine 228 can be stored in the memory 237 of the first client device 103 and can be accessible and executable by the processor 235.

In some embodiments, the GUI engine 228 generates graphical data for the heads-up display 231. For example, the GUI engine 228 receives information about roadway objects from the object detector 222 and/or the object data 297 and generates graphical data for displaying the roadway objects. The GUI engine 228 transmits the graphical data to the heads-up display 231, which displays the data on the heads-up display in the first client device 103.

In another embodiment, the GUI engine 228 receives a determination from the user view detector 224 that the user did not view a roadway object that was part of the heads-up display. The GUI engine 228 generates graphical data to emphasize those roadway objects. For example, the GUI engine 228 provides a larger icon, a highlighted icon, a colored icon, a flashing icon, etc. In some embodiments, the GUI engine 228 receives a notification from the user view detector 224 that the user eventually sees the object and deemphasizes the icon or removes the icon accordingly.

In some embodiments, the GUI engine 228 receives instructions from the analysis engine 230 about roadway objects that should be emphasized. For example, if 80% of the users fail to see a roadway object, the analysis engine 230 determines that the roadway object should be emphasized for all users. The GUI engine 228 emphasizes the roadway object using the examples described above or other examples known to those of skill in the art.

The GUI engine 228 generates graphical data for displaying the roadway objects in a spherical coordinate system that allows the user to view the roadway objects in the heads-up display without having to refocus to view the objects. The GUI engine 228 represents the driver's field of view in a spherical coordinate system where the position of an object, such as a road sign, can be represented a distance radius (r) and by the angles theta ($\theta$) and phi ($\phi$). The distance radius represents the distance from the driver's viewpoint to the roadway object. Theta is a polar angle measured from a fixed zenith direction (i.e., the angle is between the z direction and the direction of the radius). Phi is the azimuth angle of the orthogonal projection on a reference plane that passes through the origin and is orthogonal to the zenith as measured from a fixed reference direction on that plane.

In some embodiments, the GUI engine 228 displays a size of the roadway objects as a function of the distance between the first client device 103 and the roadway object. For example, the GUI engine 228 increases the size of the roadway objects as the first client device 103 approaches.

The analysis engine 230 can be software including routines for analyzing data describing roadway objects that are overlooked by drivers and determining ways to increase roadway safety. In some embodiments, the analysis engine 230 can be a set of instructions executable by the processor 235 to provide the functionality described below for analyzing data describing roadway objects that are overlooked by drivers and determining ways to increase roadway safety. In some embodiments, the analysis engine 230 can be stored in the memory 237 of the first client device 103 and can be accessible and executable by the processor 235.

In one embodiment, the analysis engine 230 receives data describing roadway objects that are overlooked by drivers. For example, the analysis engine 230 receives the object data 297 from all safety applications 199 or a central server (not shown) that records the data about roadway objects that were overlooked by drivers. In some embodiments, the data is anonymized and the object data 297 includes the roadway object, information identifying the object (person, roadway traffic sign, etc.), text associated with the roadway object, the location of the roadway object, and a percentage of drivers that overlook the roadway object.

In some embodiments, the analysis engine 230 determines clusters of roadway objects overlooked by drivers. For example, the analysis engine 230 uses cluster analysis to group a set of roadway objects. The set could include several roadway objects located in an area where it is difficult to see the objects, for example, because of poor lighting conditions or because there is too much activity nearby that drivers miss this cluster. The set could also include only one roadway object.

The analysis engine 230 generates a map or requests a map from the map application 191. The analysis engine 230 populates the map with roadway objects overlooked by drivers. The map includes roadway objects, locations of the roadway objects, and information about the roadway objects, such as whether they are roadway traffic signs, people, etc. The analysis engine 230 stores the map, for example, in the memory 237. The analysis engine 230 determines ways to increase roadway safety using the map describing overlooked roadway objects. For example, the analysis engine 230 instructs the GUI engine 228 to enhance the graphic output on the heads-up display to emphasize the commonly overlooked roadway objects that the user views during a drive. In some embodiments, the analysis engine 230 instructs the GUI engine 228 to use a different graphic to distinguish the roadway objects that other drivers overlook from roadway objects that the user has overlooked. For example, the roadway objects in the heads-up display could be highlighted with different colors, different icons, etc.

Example Heads-up Display

Figure 3:
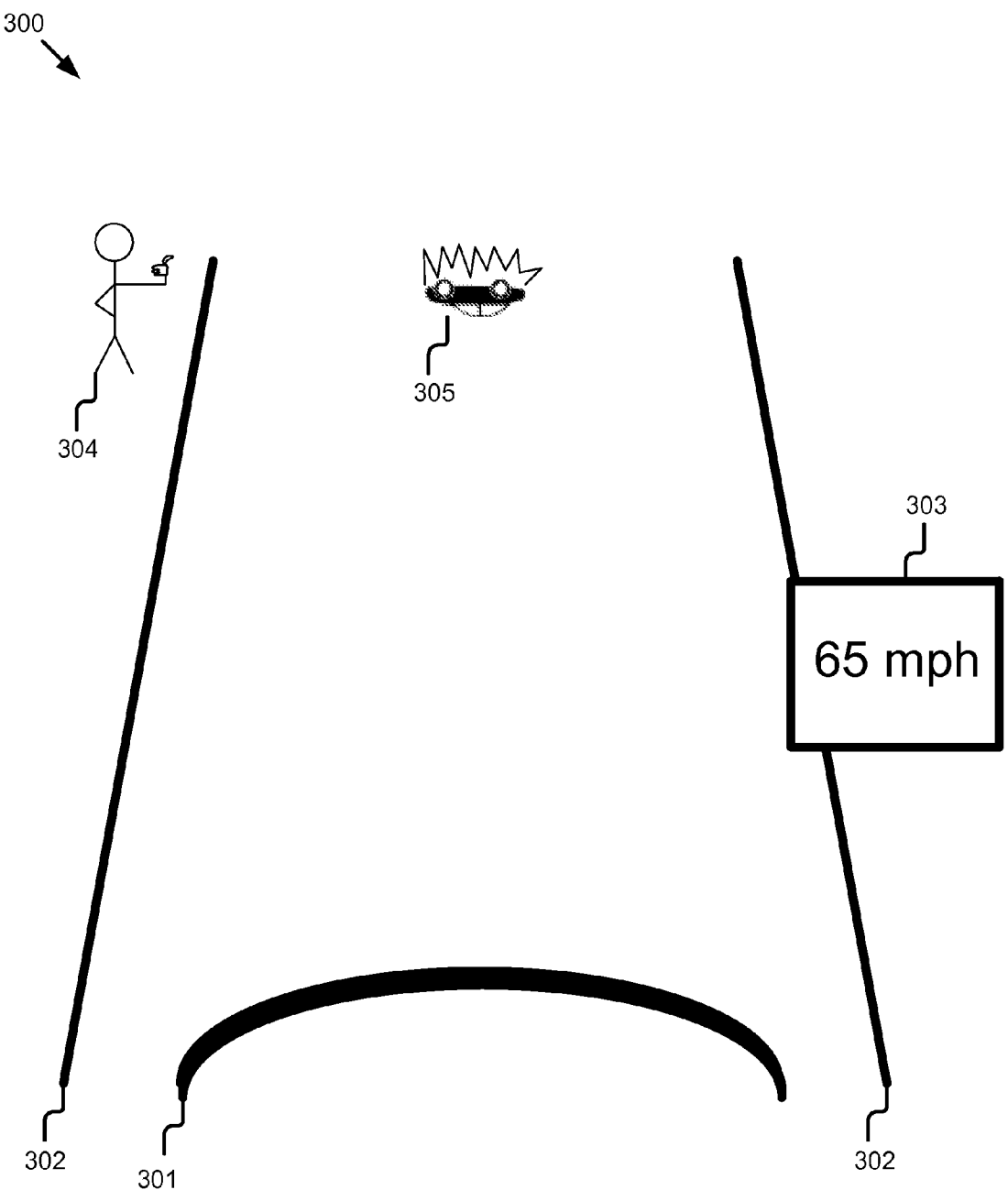
FIG. 3 is a graphic representation of a heads-up display.

FIG. 3 is a graphic representation 300 of a heads-up display from the perspective of a user in front of a steering wheel 301 looking down a road 302. In this embodiment, the GUI engine 228 instructs the heads-up display 231 to display graphical data for emphasizing roadway objects. The roadway objects could be objects that the user did not see, as determined by the user view detector 224, or objects that other users commonly fail to see, as determined by the analysis engine 230. The roadway objects can be roadway traffic signs, such as a speed limit sign 303, or other objects of interest, such as a hitchhiker 304 and an accident 305. In some embodiments, the GUI engine 228 determines the size of the object in the heads-up display as a function of distance from the object. In this example, the hitchhiker 304 and the speed limit sign 303 are nearby, and the accident 305 is much farther away. In some embodiments, the roadway objects are represented based on the spherical coordinate system.

Example Hierarchy of Importance for Roadway Objects

Figure 4:
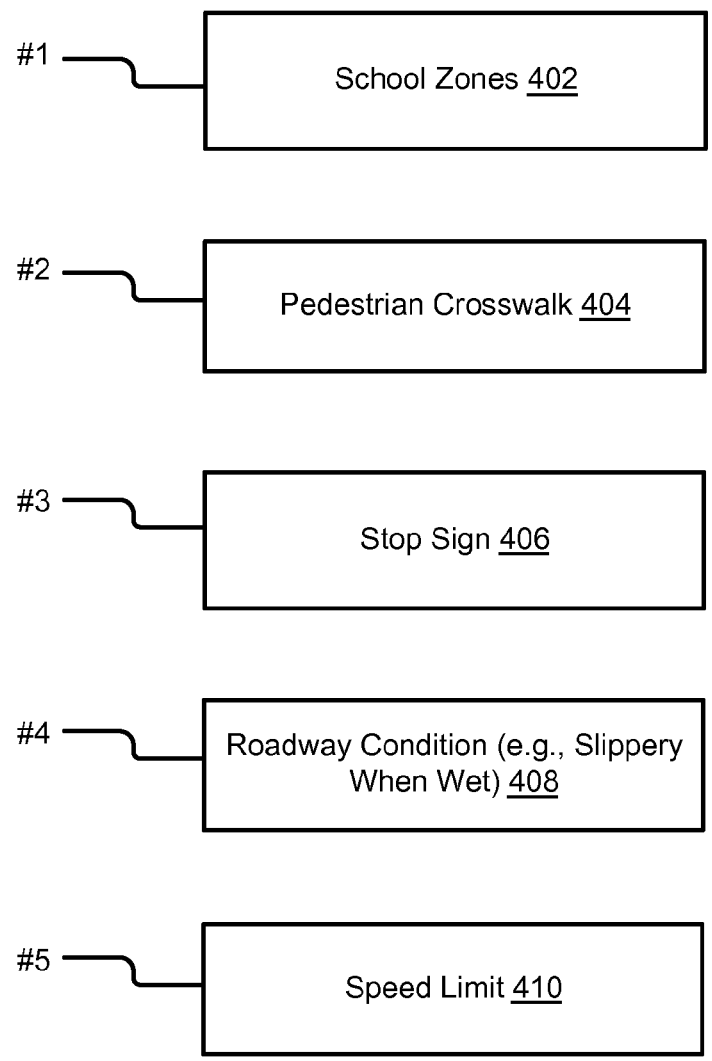
FIG. 4 is an example hierarchy of importance for roadway objects.

FIG. 4 is an example hierarchy 400 of importance for roadway objects. In one embodiment, the critical module 226 determines the hierarchy of the roadway objects based on user preferences or activities. In another embodiment, the critical module 226 determines the hierarchy of roadway objects based on a predetermined ranking In this example, the critical module 226 determines that school zones 402 have the highest ranking, then pedestrian crosswalk signs 404, then stop signs 406, then roadway conditions (e.g., slippery when wet) 408, and lastly speed limit signs 410.

Methods

Figure 5A:
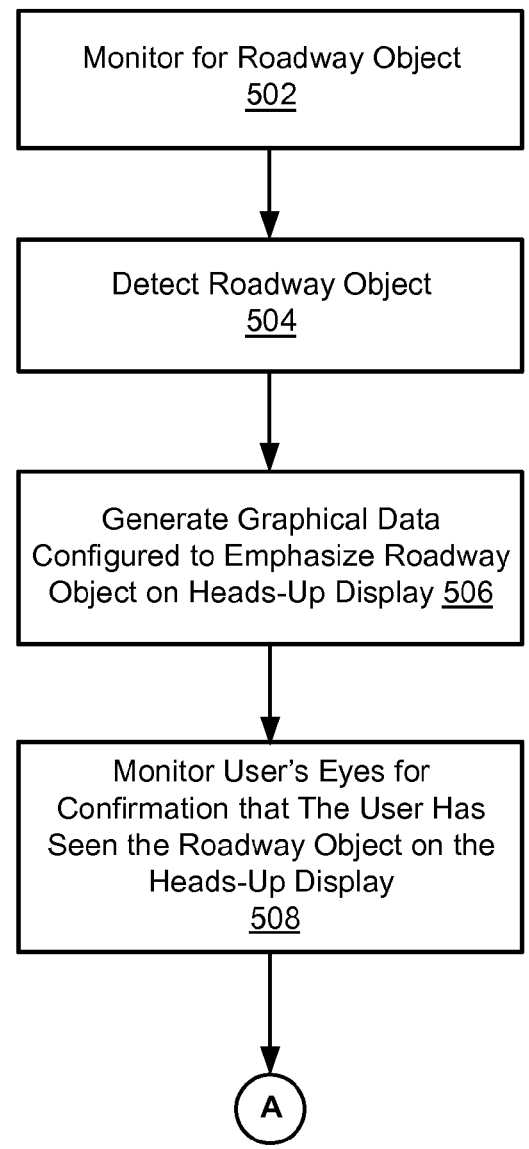
FIGS. 5A-5B are a flowchart of an example method for providing roadway object signs to the user.
Figure 5B:
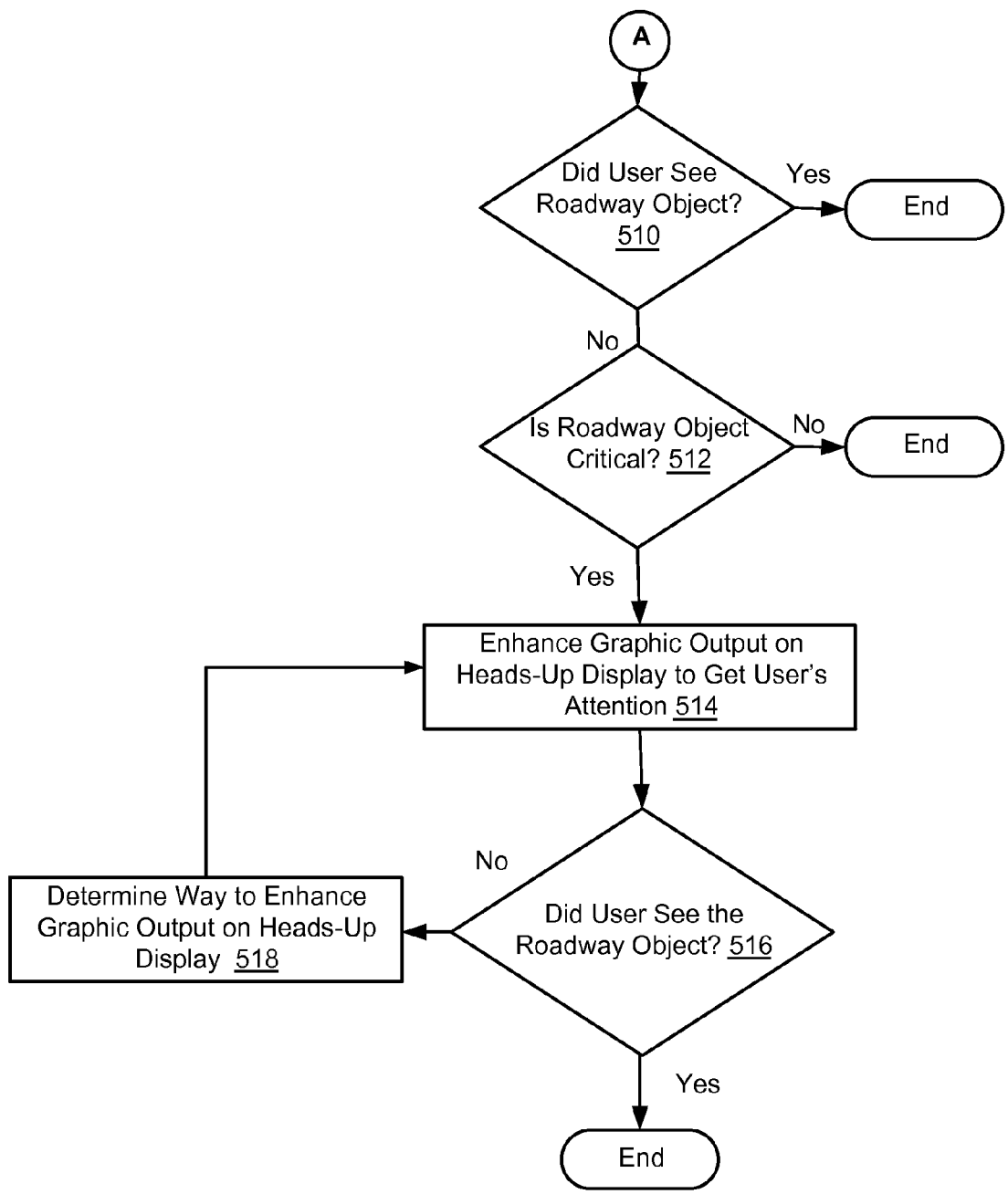

FIGS. 5A-5B are a flowchart of an example method 500 for providing roadway objects to the user. In one embodiment, the steps are performed by the safety application 199 comprising the object detector 222, the user view detector 224, the critical module 226, and the GUI engine 228.

The object detector 222 monitors 502 for roadway objects. For example, the object detector 222 receives the recordings 295 of the road from external cameras 233. The object detector 222 detects 504 roadway objects in the recordings 295. The object detector 222 instructs the GUI engine 228 to generate 506 graphical data configured to emphasize the roadway object on a heads-up display. For example, the GUI engine 228 generates an icon of a roadway object and emphasizes it based on size, color, etc. The GUI engine 228 transmits the graphical data to the heads-up display 231 for display.

The user view detector 224 monitors 508 the user's eyes for confirmation that the user has seen the roadway object on the heads-up display. For example, the user view detector 224 receives the recordings 295 from at least one internal camera 233 that display the user's eyes. The user view detector 224 determines the direction the user's eyes are looking in and determines 510 whether the user saw the roadway object. For example, the user view detector 224 compares the direction the user is looking in to the roadway objects in the recordings 295 from the external camera 233 to determine which of the roadway objects the user is looking at if there are multiple roadway objects on the road. In some embodiments, the user view detector 224 uses additional signals to confirm that the user saw the roadway object. For example, the user view detector 224 determines that the user saw the roadway object based on looking in a particular direction for a threshold amount of time, in response to the eyes dilating, etc. If the user saw the roadway object, the process ends.

If the user did not see the roadway object, the critical module 226 determines 512 whether the roadway object is critical. For example, the critical module 226 determines whether the object data 297 stored in the memory 237 designates the roadway object as being critical. If the roadway object is not critical, the process ends. If the roadway object is critical, the critical module 226 instructs the GUI engine 228 to enhance 514 the graphic output on the heads-up display to get the user's attention. For example, the GUI engine 228 could generate graphical data that increases the size of the roadway object, makes the icon of the roadway object blink, makes the icon of the roadway object brighter, etc. The critical module 226 determines 516 whether the user saw the roadway object. If not, the critical module 226 instructs the GUI engine 228 to determine 518 a way to enhance the graphic output on the heads-up display. In some embodiments, the memory 237 stores a list of different ways to enhance the graphic output on the heads-up display and each time the user fails to view a critical roadway object, the GUI engine 228 uses a different technique on the list. For example, if making the icon of the roadway object fails to work, the GUI engine 228 next tries making the icon blink. These steps continue until the user sees the roadway object.

Figure 6:
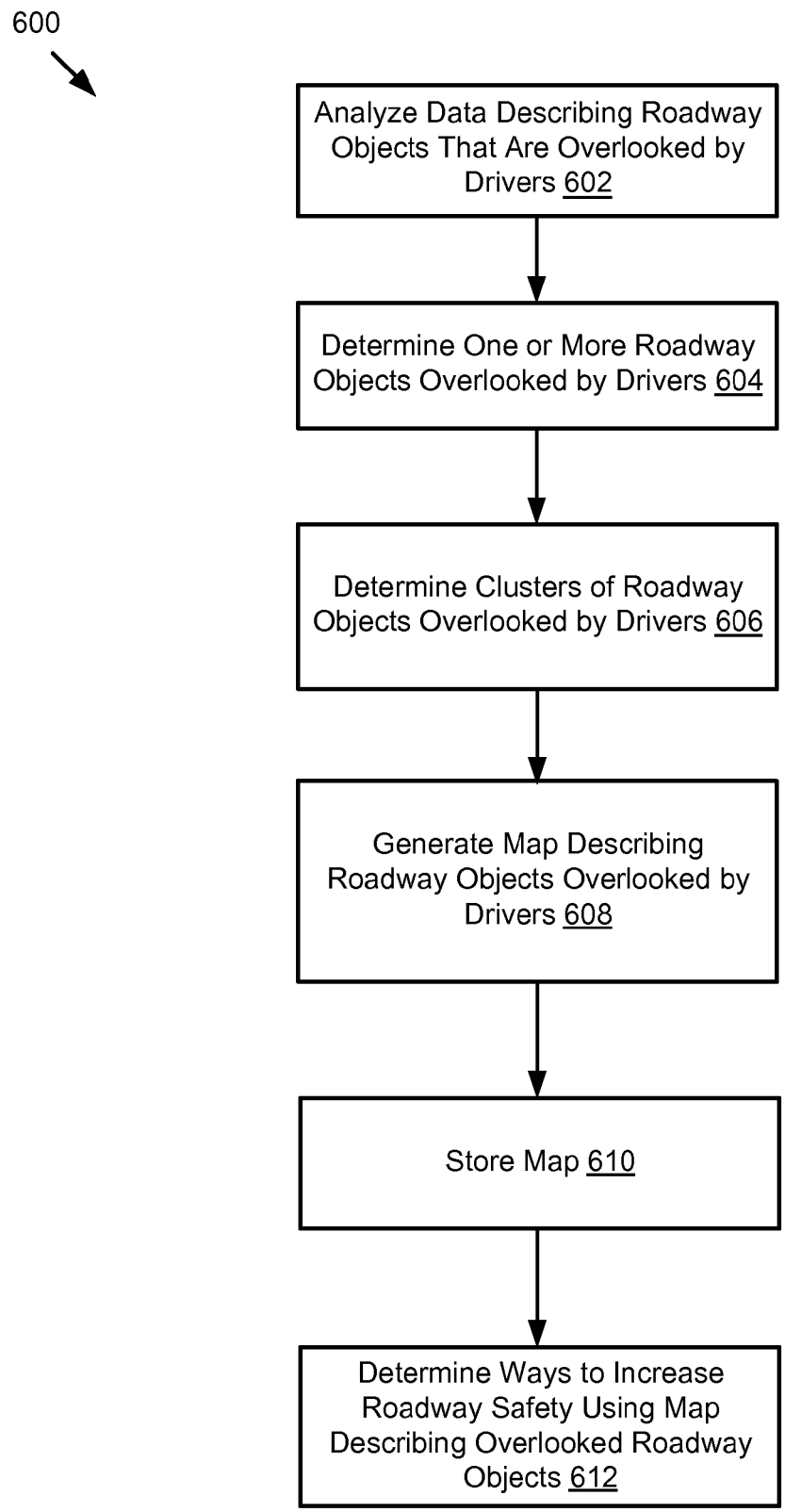
FIG. 6 is a flowchart of another example method of emphasizing roadway object signs to the user based on clustering.

FIG. 6 is a flowchart of another example method 600 of providing roadway traffic signs to the user based on clustering. In one embodiment, the steps are performed by the safety application 199 comprising the GUI engine 228 and the analysis engine 230.

The analysis engine 230 analyzes 602 data describing roadway objects that are overlooked by drivers and determines 604 one or more roadway objects overlooked by drivers. For example, the analysis engine 230 receives the recordings 295 and the object data 297 from all safety applications 199 to be able to make generalizations. The analysis engine 230 determines 606 clusters of roadway objects overlooked by drivers. For example, because of poor lighting, users may miss an entire group of roadway objects. The cluster can also be interpreted as including only one roadway object. In some embodiments, the analysis engine 230 uses the cluster data 299 stored in the memory 237 to determine the clusters of roadway objects overlooked by drivers.

The analysis engine 230 generates 608 a map describing the roadway objects overlooked by the drivers and stores 610 the map, for example, in the memory 237. In some embodiments, the analysis engine 230 retrieves a map from the map application 191 on the map server 190. The analysis engine 230 determines 612 ways to increase roadway safety using the map describing overlooked roadway objects. For example, the analysis engine 230 instructs the GUI engine 228 to generate graphical data for the heads-up display that emphasizes the roadway objects that other drivers frequently overlook. In some embodiments, the analysis engine 230 uses a threshold to determine which roadway objects should be emphasized. For example, the analysis engine 230 instructs the GUI engine 228 to generate graphical data for displaying the roadway objects that are missed 75% of the time by other drivers.

The embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments, or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   monitoring, with one or more processors of a vehicle, for a roadway object based in part on geographical data describing a present geographic location of the vehicle and an electronic map that describes a plurality of clusters along one or more roadways that are included in the electronic map, wherein a cluster includes a geographic area that includes one or more roadway objects that are determined to be frequently overlooked by other users;

detecting the roadway object;

generating graphical data configured to emphasize the roadway object on a heads-up display of the vehicle;

determining whether a user sees the roadway object;

responsive to the user failing to see the roadway object, determining whether the roadway object is critical, wherein the roadway object is determined to be critical based on a ranked hierarchy of different categories of roadway objects and the highest ranked category is a school zone; and responsive to the roadway object being critical, enhancing a graphic output on the heads-up display to get the user's attention.

2. The method of claim 1, further comprising:

responsive to enhancing the graphic output on the heads-up display to get the user's attention, determining whether the user saw the roadway traffic; and responsive to the user failing to see the roadway object, determining a way to enhance the graphic output on the heads-up display.

3. The method of claim 1, wherein determining whether the user saw the roadway object further comprises:

receiving a first recording of the user while driving and a second recording of the road;

identifying eye movement of the user in the first recording; and correlating the eye movement in the first recording with the roadway object in the second recording to determine whether the user saw the roadway object.

4. The method of claim 1, wherein determining whether the roadway object is critical further comprises:

determining a distance between a client device and a location referenced by the roadway object; and identifying the roadway object as being critical when the distance falls below a threshold.

5. The method of claim 1, wherein the graphical data on the heads-up display includes representing the user's field of view in a spherical coordinate system, representing the roadway object with an angle of theta, an angle of phi, and a distance of radius.

6. The method of claim 1, wherein the roadway object is a roadway traffic sign indicating a regulation applicable to driving on the roadway.

7. The method of claim 1, wherein the ranked hierarchy is customized for the user.

8. The method of claim 7, wherein the customization is based on a driving history of the user.

9. The method of claim 1, wherein determining whether the roadway object is critical is further based on an update from a social network application.

10. A computer program product comprising a non-transitory computer-usable medium including a computer-readable program, wherein the computer-readable program when executed on a computer causes the computer to:

monitor for a roadway object;

detect the roadway object;

generate graphical data configured to emphasize the roadway object on a heads-up display;

determine whether a user sees the roadway object;

responsive to the user failing to see the roadway object, determine whether the roadway object is critical based on a ranked hierarchy of categories, wherein a school zone is the highest ranked category included in the ranked hierarchy, a pedestrian crosswalk sign is a second highest ranked category included in the ranked hierarchy, a stop sign is a third highest ranked category included in the ranked hierarchy, a sign indicating a roadway condition is a fourth highest ranked category included in the ranked hierarchy and a speed limit sign is a fifth highest ranked category included in the ranked hierarchy; and responsive to the roadway object being critical, enhance a graphic output on the heads-up display to get the user's attention.

11. The computer program product of claim 10, wherein the computer-readable program when executed on a computer is further configured to cause the computer to:

receive a first recording of the user while driving and a second recording of the road;

identify eye movement of the user in the first recording; and correlate the eye movement in the first recording with the roadway object in the second recording to determine whether the user saw the roadway object.

12. The computer program product of claim 10, wherein the graphical data on the heads-up display includes representing the user's field of view in a spherical coordinate system, representing the roadway object with an angle of theta, an angle of phi, and a distance of radius.

13. The computer program product of claim 10, wherein the computer-readable program when executed on a computer is further configured to cause the computer to:

analyze data describing roadway objects that are overlooked by drivers;

determine one or more roadway objects that are overlooked by drivers;

determine clusters of roadway objects overlooked by drivers;

generate a map describing roadway objects overlooked by drivers; and determine a way to increase roadway safety using the map describing overlooked roadway objects.

14. The computer program product of claim 10, wherein determining whether the roadway object is critical is further based on an update from a social network application.

15. A system comprising:

a processor; and a memory storing instructions that, when executed, cause the system to:

monitor for a roadway object based on an electronic map describing locations for a plurality of roadway objects that are determined to be frequently overlooked by users;

detect the roadway object;

generate graphical data configured to emphasize the roadway object on a heads-up display;

determine whether a user sees the roadway object;

responsive to the user failing to see the roadway object, determine whether the roadway object is critical based on a ranked hierarchy of categories wherein the highest ranked category is a school zone; and responsive to the roadway object being critical, enhance a graphic output on the heads-up display to get the user's attention.

16. The system of claim 15, wherein the instructions when executed cause the system to also:

receive a first recording of the user while driving and a second recording of the road;

identify eye movement of the user in the first recording; and correlate the eye movement in the first recording with the roadway object in the second recording to determine whether the user saw the roadway object.

17. The system of claim 15, wherein the graphical data on the heads-up display includes representing the user's field of view in a spherical coordinate system, representing the roadway object with an angle of theta, an angle of phi, and a distance of radius.

18. The system of claim 15, wherein a school zone is the highest ranked category included in the ranked hierarchy, a pedestrian crosswalk sign is a second highest ranked category included in the ranked hierarchy, a stop sign is a third highest ranked category included in the ranked hierarchy, a sign indicating a roadway condition is a fourth highest ranked category included in the ranked hierarchy and a speed limit sign is a fifth highest ranked category included in the ranked hierarchy.

19. The system of claim 15, wherein enhancing the graphic output on the heads-up display includes highlighting the overlooked roadway objects on the heads-up display.

20. The system of claim 15, wherein the graphic output of the heads-up display is enhanced contemporaneous to the roadway object being viewable by the user in the heads-up display.

21. A computer-implemented method comprising:
receiving object data from a plurality of vehicles driven by a plurality of users, wherein the object data describes a plurality roadway objects that are overlooked by the plurality of users and the geographic location of the plurality of roadway objects;
analyzing, by the server, the object data to identify a plurality of roadway objects that are overlooked by users of the plurality of vehicles;
determining, by the server, one or more clusters of roadway objects that are overlooked by users of the plurality of vehicles, wherein each cluster includes a geographic area where the object data indicates difficulty for the plurality of users to see roadway objects;

generating, by the server, an electronic map including the one or more clusters along one or more roadways that are included in the electronic map, wherein the clusters are associated with a ranked hierarchy of categories wherein the highest ranked category is a school zone; and transmitting the electronic map to a vehicle, wherein the electronic map is operable so that the vehicle analyzes the electronic map to proactively identify that a journey of the vehicle includes a cluster included in the electronic map and the vehicle proactively uses a heads-up display unit of the vehicle to emphasize one or more roadway objects included in the geographic area of the cluster based at least in part on whether the one or more roadway objects are critical as indicated by the ranked hierarchy.

22. A computer-implemented method comprising:
monitoring, by an onboard computer of a vehicle, for a roadway object based in part on geographical data describing a present geographic location of the vehicle and an electronic map that describes a plurality of clusters along one or more roadways that are included in the electronic map, wherein a cluster includes a geographic area that includes one or more roadway objects that are determined to be frequently overlooked by other users and the one or more roadway objects are associated with a ranked hierarchy of categories wherein the highest ranked category is a school zone;
identifying a roadway object present in one of the plurality of clusters;
proactively generating graphical data configured to emphasize the roadway object on a heads-up display of the vehicle; and
displaying a graphical element on the heads-up display of the vehicle, wherein the graphic element is generated based on the graphical data based in part on whether the roadway object emphasized by the graphic element is critical as indicated by the ranked hierarchy.

\* \* \* \* \*